June 29, 1926.
C. F. LARZELERE ET AL
1,590,529
CASTING BAIT
Filed March 21, 1925
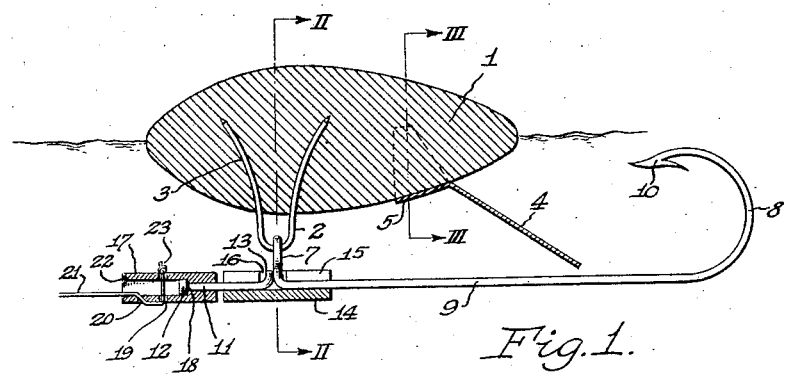
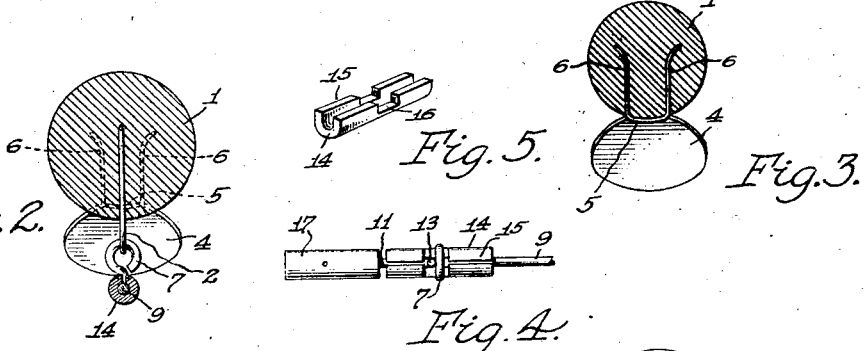
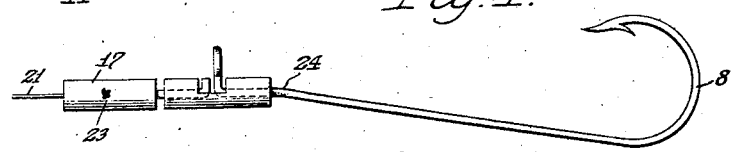
Fig. 6.
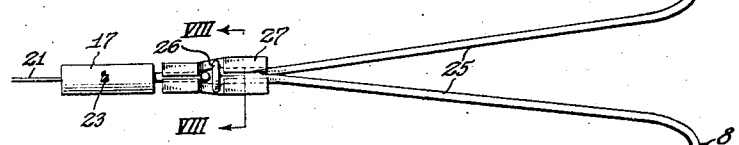
Fig. 7.
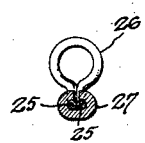
Fig. 8.
Inventor
Charles F. Larzelere,
Irvin G. Foulk,
By
Attorneys Patented June 29, 1926.

1,590,529

UNITED STATES PATENT OFFICE.

CHARLES F. LARZELERE AND IRVIN G. FOULK, OF FLINT, MICHIGAN.

CASTING BAIT.

Application filed March 21, 1925. Serial No. 17,345.

This invention relates to a casting bait and more particularly to a surface floating bait, in contradistinction to that type of plug, spoon or artificial bait used for undersurface fishing. Our invention is particularly designed for trout and bass fishing and its weight is reduced to a minimum for easy casting with a fly rod in connection with a light weight line. It is obvious that the bait may be used with a short bait casting rod or any suitable tackle.

Our invention aims to provide a casting bait of the above class which will permit of an ordinary hook being fashioned for use in connection with a buoyant member, and novel means is employed for attaching a line, gut leader, or other connector to the hook.

Our invention further aims to provide a casting bait wherein a buoyant member is equipped with a spoon, rudder, or vane which will impart an undulating, diving, or sinuous movement to the buoyant member when drawn over the surface of a body of water. The vane also serves as spacing means for a hook attached to the member and with the vane and hook disposed at the lower side of the buoyant member the hook is maintained below the surface of the water where it may be readily struck by a fish.

Our invention will be hereinafter specifically described and then claimed and reference will now be had to the drawing wherein Figure 1 is a longitudinal sectional view of the casting bait which has been illustrated larger than actually used;

Fig. 2 is a cross sectional view taken on the line II—II of Fig. 1;

Fig. 3 is a similar view taken on line III—III of Fig. 1;

Fig. 4 is a plan view of the hook and line connection;

Fig. 5 a perspective view of a coupling member;

Fig. 6 is a side elevation of a hook and line connection showing a modified form of the hook;

Fig. 7 is a plan of a hook and line connection showing still another form of hook, and Fig. 8 is a cross sectional view taken on the line VIII—VIII of Fig. 7.

In the drawing, the reference numeral 1 denotes a float or buoyant member that may be made of a light and durable material, for instance of a wood or fibrous material having a much lower specific gravity than cork, or any material suitable for casting purposes in connection with a rod. The buoyant member is substantially oval or oblong in elevation or somewhat egg-shaped, and driven into the forward portion of the member is a staple or eye 2 having diverging ends 3 to securely anchor the staple in the lower face or body portion of the buoyant member. Between this staple and the rear end of the buoyant body is a rearwardly extending and outwardly projecting vane 4 made of metal formed to provide a staple or U-shaped portion 5 for engagement with the buoyant member 1, the vane staple having diverging ends 6 firmly anchoring it in the buoyant member. The vane staple 5 is comparatively wide so that it may have a firm purchase on the lower face of the buoyant member and be prevented from turning relative to said member. This vane will cause the buoyant member to dive in and out or up and down relative to the surface of the body of water over which it is pulled and in this respect imitates the movement of a fish.

Attached to the staple 2 is the eye 7 of a hook 8, said hook having the end of its shank 9 bent so that the eye 7 is substantially at a right angle to the hook shank. The eye end of the shank is bent in a direction which will place the bill and barb 10 of the hook either up or down and in consequence of this arrangement the hook will have its shank disposed substantially parallel to the axis of the buoyant member 1. The hook shank may contact with the end of the vane 4 but not with the buoyant member during the operation of the casting bait. The buoyant member 1 and the hook 8 are positioned so that under fishing conditions the hook will be directly below the surface of the water.

Attached to the eye end of the shank 9 is a swivel member 11 having a head 12 at one end thereof and its opposite end angular, as at 13. This swivel member is placed in alinement with the hook shank 9 and is connected thereto by a coupling member 14 in the form of a malleable channel piece adapted to have its longitudinal ridges 15 brought into abutting relation or into proximity to each other so as to form a sleeve about the aligning swivel and hook. The longitudinal ridges of the coupling member 14 may be notched, as at 16, to provide clearance for the angular end 13 of the swivel member and the eye end of the hook shank 9.

Prior to mounting the swivel member 11 in the coupling member 14, it is placed in a line member 17 which is tubular and has its bore formed with a shoulder 18 for the head 12 of the swivel member. In this manner there is a free movement of the line and swivel members relative to each other. The walls of the line member 17 are provided with diametrically opposed openings 19 and another angularly disposed side opening 20 so that the end of a line 21 may be placed in the flared end 22 of the member 17, through the side opening 20 and then through the diametrically opposed openings 19. The end of the line is disposed transversely of the member 17 and is adapted to be supported, as at 23, so that the line can not be pulled out of the transverse openings 19. The line is bound by its passage through two of the openings and with all edges of the line member rounded off there is no possibility of said member cutting the line when drawn taut or subjected to a load.

With the side opening 20 adjacent the flared open end 22 of the line member 17 the end of the line 21 can be easily threaded through the opening 20 from the open end of the line member and after once passing through the opening 20, it can be easily threaded through the diametrically opposed openings 19. This form of line connection precludes cutting the line or accidental displacement thereof during casting operations.

In some instances the hook shank 9 may be bent, as at 24, to place the hook at an angle to the axis of the coupling member, and in other instances a double hook 25 may be used with integral shanks bent to form an eye 26 for attachment to the staple 2. In this instance a coupling member 27 slightly wider than that previously described is used for holding the double hook relative to a line swivel.

The line connecting member 17 constitutes a new article of manufacture, whether connected to a hook or directly or indirectly to the body of any sort of bait. The member constitutes a new article of manufacture and the arrangement of end and side openings affords a novel manner of anchoring a line, gut or the like relative to the connector.

It is thought that the utility of our casting bait will be apparent without further description and while in the drawing there are illustrated the preferred embodiments of our invention, it is to be understood that the structural elements are susceptible to such changes, in size, shape and manner of assembly as fall within the scope of the appended claims.

What we claim is:—

1. In a casting bait, a surface buoyant member, a hook attached to said buoyant member with the shank of the hook under said buoyant member and arranged to remain substantially parallel to the axis of said buoyant member during the action of said bait on a body of water, or when casting, and a vane under the rear portion of said buoyant member and preventing said hook from contacting with said buoyant member.

2. A casting bait comprising a surface buoyant member, a hook attached to said buoyant member with the shank of said hook under said buoyant member and arranged to remain substantially parallel to the axis of said buoyant member during the action of said bait on a body of water, or when casting, and means carried by said buoyant member spacing said hook relative to said buoyant member and adapted to cause an undulatory movement of said member when drawn on a body of water.

3. A casting bait comprising a buoyant member, a hook having a shank loosely connected to the lower side of said buoyant member, and a line member coupled to the shank of said hook and fixedly held in longitudinal alinement with the shank of said hook.

4. A casting bait comprising a buoyant member, a hook having a shank loosely connected to the lower side of said buoyant member, a line member, and a coupling between said hook shaft and said line member, said coupling including a swivel member having one end in said line member and its opposite end held by said hook shaft.

5. A casting bait comprising a buoyant member, a hook having a shank loosely connected to the lower side of said buoyant member, and a line member coupled to the shank of said hook, said line member being in the form of a sleeve having side line openings.

6. A hook and line attachment for a casting bait, comprising a swivel member adapted to align with a hook shank, a malleable channel coupling member embracing the confronting end of the hook shank and swivel member, and a tubular member on said swivel member and provided with line receiving openings.

7. A hook and line attachment as called for in claim 6 wherein said swivel member is axially of said tubular member and has a head loosely retained in said tubular member.

8. A casting bait comprising a buoyant member, a staple having diverging ends in said buoyant member, a vane having diverging ends in said buoyant member, and a hook and line connection with said staple.

9. A casting bait as called for in claim 8 wherein said hook and line connection is under said buoyant member and said line connection maintains said hook substantially parallel to the axis of said buoyant member.

10. As a new article of manufacture, a tackle connector having a head and a member swiveled on said head and through which member a line, gut, or other member is adapted to extend twice in different directions.

In testimony whereof we affix our signatures.

CHARLES F. LARZELERE.
IRVIN G. FOULK.